July 27, 1965    J. JONES-HINTON ETAL    3,196,488
HEATERS FOR VACUUM FORMING APPARATUS
Filed May 9, 1962    2 Sheets-Sheet 1

July 27, 1965   J. JONES-HINTON ETAL   3,196,488
HEATERS FOR VACUUM FORMING APPARATUS
Filed May 9, 1962   2 Sheets-Sheet 2

3,196,488
HEATERS FOR VACUUM FORMING APPARATUS
James Jones-Hinton, Tanworth-in-Arden, Solihull, and Thomas Edward Horace Gray, Wylde Green, Sutton Coldfield, England, assignors to Dunlop Rubber Company Limited, London, England, a company of Great Britain
Filed May 9, 1962, Ser. No. 193,586
5 Claims. (Cl. 18—19)

This invention relates to heaters for vacuum forming apparatus.

Forming shaped articles from sheets of thermoplastic material by the method of vacuum forming is brought about by clamping a sheet of the material around its edge, softening the sheet by the application of heat and pressing the sheet intimately against a former by withdrawing the air from the space between the sheet and the former and so shaping the sheet to the profile of the former.

Difficulty is experienced, when sheets of large size, for example, 8 ft. x 4 ft., are used, in obtaining uniform heating across the whole length and width of the strip and, when heaters of known form are utilised hot spots often develop, in localised areas of the sheet, which cause excessive softening of the sheet in those areas resulting in uneven stretching and localised thin spots.

It is an object of the present invention to provide a heater which will more uniformly heat a thermoplastic sheet in a vacuum forming process so that a product of more uniform thickness can be formed.

According to the invention apparatus for forming sheets of thermoplastic materials by the vacuum process comprises a framework for clamping a sheet of said material, and a heater for softening sheets supported by the framework prior to forming, said heater comprising a substantially continuous reticulate heating element having a heating surface area substantially equal to the area within the clamping framework.

Preferably the clamping framework takes the form of the sides of a box, the internal surfaces of the sides being heat reflective, e.g. of a polished aluminum, and operating to utilise heat from the heater which would otherwise escape by reflecting it onto the borders of the sheet. The box may be of substantial depth in comparison with the width and length of the sheet e.g. 4″ to 8″ for sheets, respectively, of 2 ft. width x 4 ft. length to 4 ft. width x 8 ft. length.

Preferably the heater comprises a plurality of strips of expanded metal for connection to a source of electrical energy. The strips may be mounted on an electrically insulating support in a common plane.

One embodiment of the invention will now be described with reference to the accompanying drawings in which.

Figure 1:
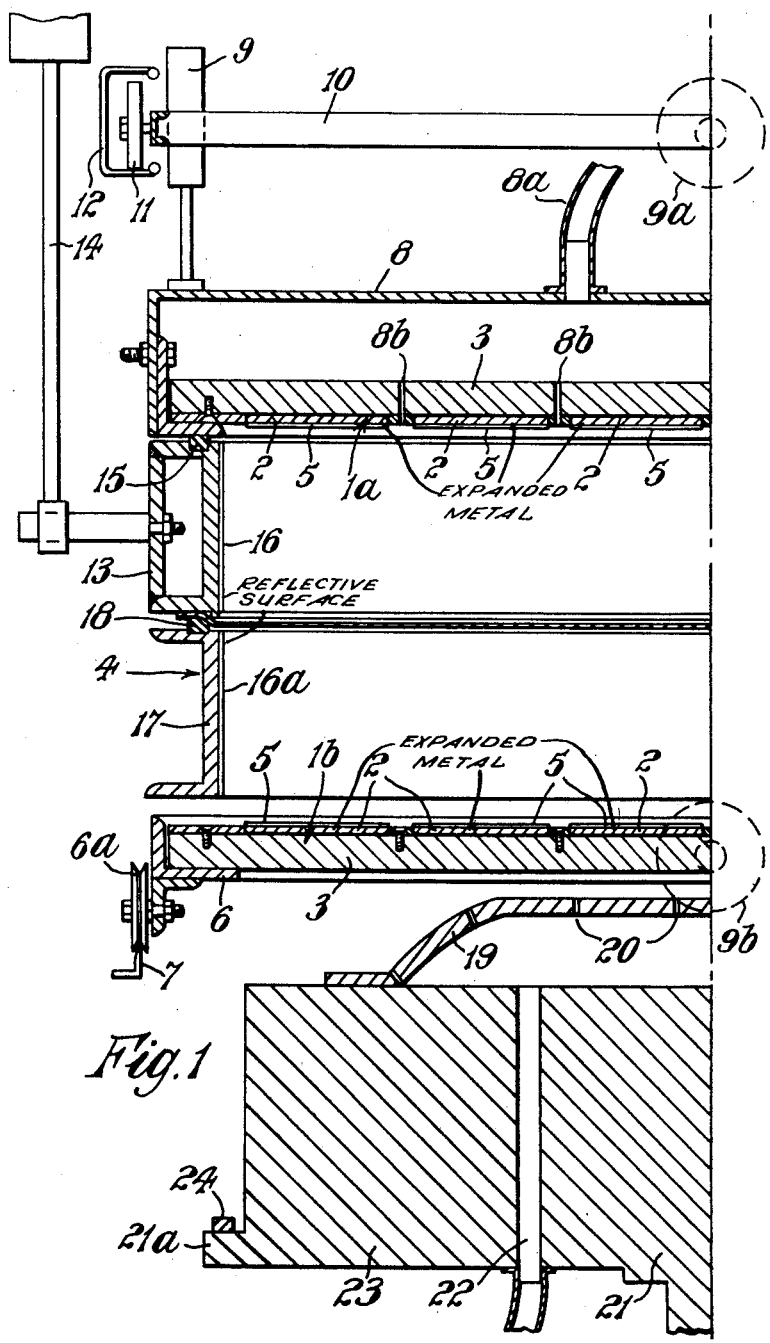
FIGURE 1 shows part of a vacuum forming apparatus in cross-sectional end elevation.

Each heater 1a, 1b comprises six strips 2 of expanded metal (three only of the strips are shown for each heater) each strip being 8 feet long by 8 inches wide and provided at each end with metal bars 5 extending for the whole width of the expanded metal strips. The bars are clamped to the expanded metal strips and form electrical connections.

The strips are mounted on a base 3 of electrical and heat insulating material, formed from an asbestos composition. The elements are slightly spaced from one another but form, when taken together, a substantially continuous reticulate structure. The two heaters constructed as just described are disposed horizontally in a vacuum forming apparatus 4.

Figure 2:
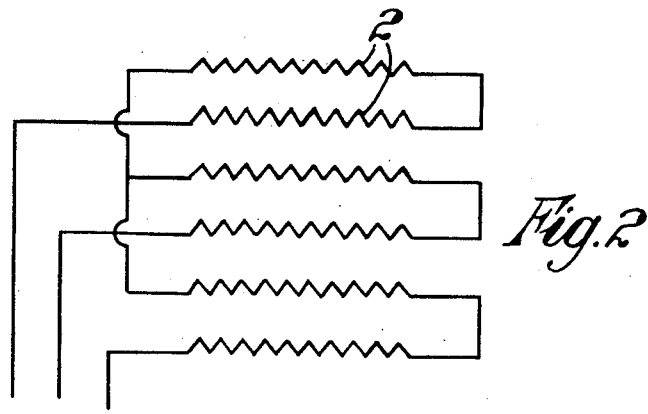
FIGURE 2 shows one method of connecting the heating elements to a three-phase supply.
Figure 3:
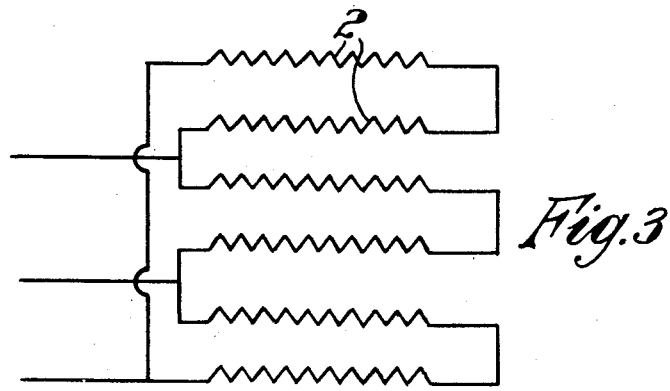
FIGURE 3 shows another method of connecting the elements.

The heating elements are connected by means of a switch, in a manner well known, either in "star" formation as shown in FIG. 2 or in "delta" formation as shown in FIG. 3 to a 440 volt 3 phase supply and the total resistance of each phase is 6.05 ohms. When connected in "star" formation the heater dissipates a power of 1 kilowatt per square foot and when connected in "delta" the power dissipated is 3 kilowatts per square foot.

The vacuum forming apparatus 4 illustrated in FIGURE 1 is constructed in the following manner.

The heaters 1a, 1b are mounted one on a lower support 6 which carries a set of four wheels 6a in engagement with a pair of rails 7, the other heater being supported in an upper vacuum box 8 supported by vertically-mounted pistons and cylinders 9 which are secured to a carriage 10 running on four wheels 11 within the rails 12 of U-shaped cross-section. A horizontally-mounted piston and cylinder 9a is connected to the vacuum box 8 for traversing it along the rails 12, and a second horizontally-mounted piston and cylinder 9b is connected to the lower support 6 for traversing it above the rails 7.

An upper clamp framework 13 is supported intermediate the heaters by means of a pair of vertically-mounted pistons and cylinders 14. The upper clamp framework has a compressible rubber seal 15 surrounding its outer periphery and on its uppermost surface for engagement with the peripheral lower surface of the vacuum box 8. The internal surfaces of the upper clamp framework have sheets of polished aluminum 16 attached thereto.

The lower clamp framework 17 is located adjacent to the upper clamp framework and operates in conjunction with it in the manner to be described. The upper peripheral surface of the lower clamp framework is provided with a compressible rubber sealing member 18 which serves to clamp a sheet of thermoplastic material securely against the lower peripheral surface of the upper clamp framework. The lower clamp framework is also provided on its internal surfaces with sheets of polished aluminum 16a.

A forming tool 19 having openings 20 disposed over its forming surface is mounted on a ram 21 located below the lower heater 1b. A pipe 22 passes through the ram head 23 and is connected to a source of vacuum, the pipe extending into a space between the ram head and forming tool so that vacuum can be applied to the openings 20. The ram head carries on a flange 21a disposed around its outer periphery a compressible sealing member 24 which is engageable, when the lower heater 1b is moved out of position, with the lower peripheral surface of the lower clamp framework so that a vacuum created within the clamp framework can be maintained. The source of vacuum can also be applied to the vacuum box 8 through the pipe 8a, passageways 8b being provided in the upper heater base 3 so that a vacuum created in the vacuum box may be effective in supporting a sheet of thermoplastic material as will be described later.

The operation of the apparatus just described is as follows.

The apparatus, at the commencement of vacuum moulding, is adjusted so that both heaters are moved on the rails 7 and 12 clear of the upper and lower clamp frameworks, the upper clamp framework being raised by means of pistons and cylinders 14 above the lower clamp framework 17. The ram 21 is located in its lower position with the forming tool 19 supported on its upper surface.

A sheet of polypropylene is located on the compressible sealing member 18 carried by the lower clamp framework and the upper clamp framework is moved into clamping relationship with the sheet by means of the pistons and cylinders 14. The heaters 1a and 1b which have previously been connected to an electrical supply to enable them to heat up, are moved into position along the rails adjacent to the upper and lower clamp frameworks so that the heat from the heaters is directed towards the upper and lower surfaces of the polypropylene sheet. The vacuum box carrying the upper heating strips is moved by means of the pistons and cylinders 9 so that it engages with the compressible rubber seal 15.

As the sheet softens under the influence of the heat, vacuum is applied through the pipe 8a to the vacuum box 8, the vacuum operating against the upper surface of the sheet to support it and prevent it from sagging during the heating operation. This construction and arrangement is described in co-pending patent application No. 142,111, filed Oct. 2, 1961. The upper and lower heater strips uniformly heat the exposed surfaces of the sheet since heat which would otherwise escape is reflected on to the borders of the sheet by the aluminum strips 16 and 16a.

The size of the sheet in the apparatus illustrated is 8 ft. long x 4 ft. wide and the distance between the surface of the sheet and the adjacent heater strips, in the case of each surface is 8 inches.

When the sheet has softened sufficiently, the lower heater strips are moved clear to allow the ram 21 to move the forming tool up into engagement with the lower surface of the polypropylene sheet, the compressible sealing member 24 engaging with the lower surface of the lower clamp framework to form a seal and enable the vacuum which is created within the forming tool to be established and maintained whereby the softened polypropylene sheet is drawn into close forming relationship with the forming tool 19. The vacuum which has been created in the vacuum box 8 is broken prior to the establishment of a vacuum within the forming tool 19.

The heaters are then switched off and removed and after sufficient time has been left for the polypropylene sheet to cool in its formed shape, the vacuum within the tool is broken and the ram moved downwardly clear of the formed sheet. The formed sheet is then removed from the apparatus by actuation of the pistons and cylinders 14 which move the upper clamp framework clear of the lower clamp framework.

It is found that when a thermoplastic sheet of large dimensions, e.g. 8 ft. by 4 ft., is heated on its opposite sides by heaters, one to each side, designed in a manner such as has been described, substantially uniform heating over the large area of sheet is obtained.

Heaters such as have been described in this specification may also be used for example in apparatus forming the subject of the above said co-pending patent application and the heaters may be used to form boats such as are described in co-pending patent application No. 155,123, filed Nov. 27, 1961, now abandoned.

Any thermoplastic material which can be obtained in sheet form can be softened by the heaters forming the subject of the invention. Typical examples of suitable thermoplastic material are plasticized or unplasticized vinyl resins, polypropylene and polyacrylates.

Having now described our invention, what we claim is:

1. Apparatus for forming sheets of thermoplastic materials by the vacuum process comprising a framework, having an upper portion and a lower portion with said upper portion locatable directly above said lower portion, each portion being in the form of the sides of a box, means for relatively moving said portions vertically into and out of clamping engagement respectively for clamping a sheet of thermoplastic material between the portions and for releasing a sheet of said material from between said portions, two heaters locatable in position one above and one below the framework for softening a sheet of said material supported by the framework prior to forming, each heater comprising a substantially continuous reticulate heating element and having a heating surface area substantially equal to the area within the clamping framework, and means for moving at least one of the heaters in a horizontal direction towards and away from the framework.

2. Apparatus for forming sheets of thermoplastic materials by the vacuum process comprising a framework, having an upper portion and a lower portion with said upper portion locatable directly above said lower portion, each portion being in the form of the sides of a box, means for relatively moving said portions vertically into and out of clamping engagement respectively for clamping a sheet of thermoplastic material between the portions and for releasing a sheet of said material from between said portions, two heaters locatable in position one above and one below the framework for softening a sheet of said material supported by the framework prior to forming, each heater comprising a substantially continuous reticulate heating element and having a heating surface area substantially equal to the area within the clamping framework, a pair of guide rails having one of said heaters mounted thereon and a fluid pressure operated piston and cylinder assembly for moving said one heater along the guide rails in a horizontal direction towards and away from the framework, the piston of said assembly being drivably connected to said one heater.

3. Apparatus for forming sheets of thermoplastic materials by the vacuum process comprising a framework, having an upper portion and a lower portion with said upper portion locatable directly above said lower portion, each portion being in the form of the sides of a box, means for relatively moving said portions vertically into and out of clamping engagement respectively for clamping a sheet of thermoplastic material between the portions and for releasing a sheet of said material from between said portions, two heaters locatable in position one above and one below the framework for softening a sheet of said material supported by the framework prior to forming, each heater comprising a substantially continuous reticulate heating element and having a heating surface area substantially equal to the area within the clamping framework, means for moving at least one of the heaters in a horizontal direction towards and away from the framework, and a vacuum chamber, said one movable heater forming one of the sides of said chamber, and said one heater having a passageway therein which extends from the interior of the chamber to an exterior surface of said one heater.

4. Apparatus for forming sheets of thermoplastic materials by the vacuum process comprising a framework, having an upper portion and a lower portion with said upper portion locatable directly above the said lower portion, each portion being in the form of the sides of a box, means for relatively moving said portions vertically into and out of clamping engagement respectively for clamping a sheet of thermoplastic material between the portions and for releasing a sheet of said material from between said portions, two heaters locatable in position one above and one below the framework for softening a sheet of said material supported by the framework prior to forming, each heater comprising a substantially continuous reticulate heating element and having a heating surface area substantially equal to the area within the clamping framework, means for moving at least one of the heaters in a horizontal direction towards and away from the framework, and a vacuum chamber, said one movable heater forming one of the sides of said chamber, and said one heater having a passageway therein which extends from the interior of the chamber to an exterior surface of said one heater, said chamber and said one heater being movable vertically towards and away from the framework, sealing means for fluid-tightly sealing said one chamber and said one heater to the framework and means for moving said chamber and said one heater vertically into sealing engagement with the framework.

5. Apparatus for forming sheets of thermoplastic materials by the vacuum process comprising a framework, having an upper portion and a lower portion with said upper portion locatable directly above said lower portion, each portion being in the form of the sides of a box, means for relatively moving said portions vertically into and out of clamping engagement respectively for clamping a sheet of thermoplastic material between the portions and for releasing a sheet of said material from between said portions, two heaters locatable in position one above and one below the framework for softening a sheet of said material supported by the framework prior to forming, each heater comprising a substantially continuous reticulate heating element and having a heating surface area substantially equal to the area within the clamping framework, a pair of guide rails having one of said two heaters mounted thereon, a fluid pressure operated piston and cylinder assembly for moving said one heater along the guide rails in a horizontal direction towards and away from the framework, the piston of said assembly being drivably connected to said one heater, a vacuum chamber, said one heater forming one of the sides of said chamber and said one heater having a passageway therein which extends from the interior of the chamber to an exterior surface of said one heater, said chamber and said one heater being movable vertically towards and away from the framework, sealing means for fluid-tightly sealing said chamber and said one heater to the framework and a fluid pressure operated piston and cylinder assembly for moving said chamber and said one heater vertically into sealing engagement with the framework, the piston of said assembly being drivably connected to said one heater.

References Cited by the Examiner
UNITED STATES PATENTS

| | | | |
|---|---|---|---|
| 2,781,078 | 2/57 | Dovidio | 18—19 XR |
| 2,814,074 | 11/57 | Butzko | 18—19 |
| 2,989,780 | 6/61 | Zimmerman | 18—19 XR |
| 3,025,566 | 3/62 | Kostur | 18—19 |
| 3,041,669 | 7/62 | Marshall et al. | 18—19 |
| 3,072,964 | 1/63 | Tilden | 18—19 |
| 3,084,389 | 4/63 | Doyle | 18—19 XR |
| 3,121,920 | 2/64 | Doyle et al. | 18—19 |

WILLIAM J. STEPHENSON, *Primary Examiner.*

MICHAEL V. BRINDISI, *Examiner.*